US007014416B2

(12) United States Patent
Lund

(10) Patent No.: US 7,014,416 B2
(45) Date of Patent: Mar. 21, 2006

(54) CONTROL VANE FOR A WIND TURBINE

(76) Inventor: Arnold Morten Lund, Lund Enterprises, Inc., 1210 Avocado Ave., Escondido, CA (US) 92026

( * ) Notice: Subject to any disclaimer, the term of this patent is extended or adjusted under 35 U.S.C. 154(b) by 26 days.

(21) Appl. No.: 10/834,299

(22) Filed: Apr. 27, 2004

(65) Prior Publication Data

US 2005/0238489 A1 Oct. 27, 2005

(51) Int. Cl.
*F03D 7/04* (2006.01)

(52) U.S. Cl. ............................ 415/4.3; 416/11; 416/12

(58) Field of Classification Search .................... 416/9, 416/17, 12, 10, 11, 13, 15, 23, 156; 415/4.3, 415/4.5, 2.1, 4.1, 146, 147, 908; 290/44, 290/55

See application file for complete search history.

(56) References Cited

U.S. PATENT DOCUMENTS

| | | | | |
|---|---|---|---|---|
| 244,677 | A | 7/1881 | Sherwood | |
| 749,806 | A | 1/1904 | Rue | |
| 2,030,953 | A | 2/1936 | Gemeny | |
| 2,052,454 | A | 8/1936 | Ellwood | |
| 2,080,955 | A | 5/1937 | Watkins | |
| 3,580,694 | A | 5/1971 | Andersen | |
| 4,084,921 | A | 4/1978 | Norz | |
| 4,306,838 | A | 12/1981 | Trainer | |
| 4,877,374 | A | 10/1989 | Burkett | |
| 5,137,417 | A | 8/1992 | Lund | |
| 5,286,166 | A | 2/1994 | Steward | |
| 5,366,342 | A * | 11/1994 | Sutz | 416/12 |

* cited by examiner

*Primary Examiner*—Thomas E. Lazo
*Assistant Examiner*—Richard A. Edgar
(74) *Attorney, Agent, or Firm*—Gene Scott; Patent Law & Venture Group

(57) ABSTRACT

A wind turbine uses a support tower with a rotatable upper portion supporting an electric generating turbine. A set of radially oriented blades rotate in a vertical plane. A control vane is mounted on a hinge bar and is movable vertically along the bar as well as bilaterally about the hinge bar, when the control vane is lifted out of a restraint well under the force of a wind vector moving in a first horizontal direction where the turbine would be counter-rotated. The control vane is pressed into the restraint well under the force of a wind vector moving in a second direction, essentially opposing the first direction. The control vane is urged to rotate laterally when lifted out of the restraint well, thereby rotating the upper tower portion until the control vane is positioned for being pressed into the restraint well so as to align the turbine blades for preferred blade rotation.

5 Claims, 3 Drawing Sheets

CONTROL VANE FOR A WIND TURBINE

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention generally relates to wind turbines and more particularly to a wind turbine having a control vane for moving the turbine away from a reversal wind vector.

2. Description of Related Art

The following art defines the present state of this field:

Sherwood, U.S. Pat. No. 244,677 describes a horizontal windmill, the combination, with a staudard and a vertical shaft, of one or more sets of fixed radial arms secured on squared portions of said vertical shaft, each fixed arm having a hinged arm provided with wings adapted to automatically open and close, substantially as set forth.

Rue, U.S. Pat. No. 749,806 describes a device the combination of a rotary frame, shafts journaled op the frame and provided with means for engaging the same for limiting their rotation, blades mounted on the shafts and capable of rotating independently of the same, and springs housed within the blades with and connected to the shafts and maintaining the same normally in operative position, substantially as described.

Gemeny, U.S. Pat. No. 2,030,953 describes an automatic self-adjusting variable pitch propeller having a hub portion, and a plurality of blades having shanks mounted for turning movement in the hub for variation of the pitch of the propeller, weight lever means connecting relatively opposite sides of different blades for balancing out centrifugal forces tending to turn the blades in the hub when the propeller is operated, and means cooperating with the blades controlling the pitch of the propeller in relation to the air forces acting thereon when the propeller is operated.

Ellwood, U.S. Pat. No. 2,052,454 describes a propeller, a rotary shaft, a blade carrying ring carried by said shaft; a synchronizing disk rotatable with respect to said ring and having tangentially disposed slots, coupling yokes swiveled in said slots, pitch changing shafts radially supported with relation to said ring, tubular stems about said pitch changing shafts, propeller blades rotatable about and shiftable on said stems and having the pitch changing shafts fixed thereto, hubs fixed to said pitch changing shafts and having spiral connections with the stems, spring tensioned means connected with the ring; and disk for normally holding the coupling yokes at the inner ends of the tangential slots in said disk, the blades having wider portions at their outer ends and provided with longitudinal slots accommodating said stems, and weights on the wider ends of said blades.

Watkins, U.S. Pat. No. 2,080,955 describes a device including: a generator; an armature shaft for the generator; a wind driven propeller mounted on the armature shaft; pivoted blades on the propeller; a yielding connection between the propeller and shaft; and means of such a character that increased load in the generator will operate through said yielding connection to pivot the blades of the propeller to retard the speed thereof.

Andersen, et al., U.S. Pat. No. 3,580,694 describes a combined fluid impeller and self-sealing closure having a plurality of blades mounted on the periphery of a rotor ring for pivotal movement about a radial axis. The blades are arranged so that they are in overlapping, sealing relationship with respect to one another when the impeller is at rest, and are in an open, impelling position when the impeller is rotating. The blades are opened by means of weights arranged in the rotor ring which are moved by centrifugal force when the impeller is rotating and rotates a control member arranged inside the rotor ring which in turn rotates the blades to their open position.

Norz, U.S. Pat. No. 4,084,921 describes a mechanism for turning a horizontal axis rotor windmill into the direction of the wind, either under the instruction of a small pilot vane, or automatically without the use of such vane. This is accomplished by cyclically controlling the pitch of the rotor blades during revolution whereby to decrease the gyro forces on the rotor when yawing, as well as to take advantage of the force of the wind on the blade to assist turning the axis into the wind. The mechanism of the present invention automatically and cyclically alters the pitch of the blades as the yaw angle of the wind changes so as to present a cyclically different angle of attack between the blades and the wind, thus utilizing the force of the wind to cause the turning of the axis of the rotor into the wind.

Trainer, U.S. Pat. No. 4,306,838 describes force transferring elements which include a metal or plastic hub deep drawn or elongated with a flange extending therefrom and functioning as a force transferring element. The hub and flange may be of one piece with the flange having blades extending outwardly from the hub, the hub around its circumference being provided with a plurality of indented portions or corrugations to provide a spring action for engagement with a shaft. In another form of the invention two similar pieces are utilized each with a deep drawn or elongated hub and having outer rims which together receive a V-belt or the like. The elements may be connected to a shaft for input to the shaft, or may be carried on the shaft as energy converting or driving members.

Burkett, U.S. Pat. No. 4,877,374 describes a windmill which automatically compensates for increased wind velocity, causing the blades to feather and rotate at a substantially constant velocity rather than overspeeding. This is accomplished by pivotally mounting the blades so that they are rotatable between positions of relatively high angle with respect to the direction of the wind and positions of relatively shallow angle, with a resilient means biasing them to the former position. Tabs projecting forwardly at obtuse angles from the outer ends of the leading edges of the blades cause the blades to be pivoted to the feathered position when wind velocity increases.

Lund, U.S. Pat. No. 5,137,417 describes a wind energy conversion system including specially shaped blades mounted in a specific location on a specially shaped blade-supporting body to maximize energy conversion from wind energy to electrical energy. The blade-supporting body includes a concave section located upstream of a convex section, with the two sections being joined together at a location of maximum diameter. The blades are mounted on the body at the location of maximum diameter. Each blade includes two surfaces each of which includes a concave section and a convex section. The blade surfaces are spaced apart from each other by a blade thickness dimension that increases from essentially zero at blade tips to a maximum adjacent to a blade longitudinal axis that extends from a blade proximal end mounted on the blade-supporting body to a distal end spaced from said blade-supporting body.

Steward, U.S. Pat. No. 5,286,166 describes an automatic centrifugal force variable pitch propeller assembly including a plurality of propeller blades mounted within a housing, each of the propeller blades being mounted to permit limited radial travel in its entirety and simultaneous incremental rotation about its longitudinal axis, the limited radial travel of each of the propeller blades in its entirety being caused by a centrifugal force developed by rotation of the propeller assembly and extending between an inward position corresponding to rotation of the propeller assembly at an idle speed and outward position corresponding to rotation at a maximum speed. The propeller assembly includes a pitch change mechanism that is coupled to the shaft end of each of the propeller blades and is solely responsive to radial travel of each of the propeller blades, caused by the centrifugal forces developed by rotation of the propeller assembly, for causing an identical predetermined incremental rotation of each of the propeller blades about its longitudinal axis that is a nonlinear function of the radial travel of each of the propeller blades. The propeller assembly also includes a rigid mechanical interconnection between the shaft ends of each of the propeller blades to insure that the propeller blades travel radially in their entirety in concert with each other to provide fail safe operation of the propeller assembly.

Lund, U.S. Pat. No. 5,599,168 describes a wind turbine apparatus having a frame assembly consisting of a hub and an outer rim interconnected by a series of spokes. Several wind vanes are rotatably secured within the frame assembly so as to extend from the hub radially outwardly around the frame assembly. Each wind vane consists of an impeller and an impeller shaft, the impeller shaft being positioned so that it does not pass through the center of wind moment of the impeller. Thus, when a wind vector reaches the impeller, the impeller and shaft rotate in direct accordance with the wind's velocity, thus ensuring that the impeller faces optimally into the wind. A biasing device is attached to each impeller shaft, the biasing device serving to retard the rotation of the wind vanes when the wind vector exceeds a given velocity, thus ensuring that the impellers maintain a constant rotational speed. A link means interconnects the adjacent impeller shafts so as to ensure that the wind vanes rotate simultaneously.

The prior art teaches wind wheels, windmills, automatic variable pitch propellers, propeller governors, fluid impellers having self-sealing closures, feathering blades, self directing windmills, wind energy converters, and wind turbine adaptable to wind direction, but does not teach the present invention with capacity for detecting a wind reversal and for thereafter moving under wind force to a normal wind flow position. The present invention fulfills these needs and provides further related advantages as described in the following summary.

SUMMARY OF THE INVENTION

The present invention teaches certain benefits in construction and use which give rise to the objectives described below.

Wind turbines mounted atop towers are well known in the art and provide an important portion of the electricity generated in the United States and elsewhere; see my patent U.S. Pat. No. 5,599,168, issued on Feb. 4, 1997. Such turbines are used in high wind areas and are subject to strong winds which change direction from moment to moment. To enable such turbines to constantly receive the maximum force of such winds, they are mounted on towers which permit the turbine to rotate, always keeping the wind vector aligned with the rotational axis of the turbine. Wind turbines are designed to rotate in a preferred direction and must be prevented from turning in the reverse direction so as to prevent damage to the generator. However, wind vectors have been known to reverse fully by 180 angular degrees thereby causing a major anti-rotational load on the turbine blades and if such condition were to be maintained until the blades are stopped and reversed, the generator can be damaged. When the wind vector reverses, it can be seen that a strong wind vector will tend to hold the turbine from revolving back to its preferred position because as the turbine tends to rotate, the sides of the turbine housing tend to place a growing surface in the path of the wind force vector downwind of the pivot point of the turbine housing. Therefore, the turbine may become wind-locked in the reverse position. The present invention is designed to alleviate this possibility.

A control vane is mounted on a hinge bar mounted on the downwind surface of the rotational support tower of the turbine, and is movable in vertical translation along the bar as well as bilaterally for rotation about the hinge bar. The control vane is pressed into a restraint under the force of a normal wind vector so that is remains aligned with the turbines axis of rotation. However, The control vane is lifted out of the restraint by a reversed wind vector under which the turbine would tend to counter-rotate. When this happens, the control vane is urged to rotate laterally thereby using the wind vector force for rotating the upper portion of the tower until the control vane is aligned with the restraint again, and is then pressed into the restraint so as to align the turbine blades for preferred blade rotational sense.

A primary objective of the present invention is to provide an apparatus and method of use of such apparatus that provides advantages not taught by the prior art.

Another objective is to provide such an invention capable of generating electricity from wind power while avoiding a reversal wind vector.

A further objective is to provide such an invention capable of sensing when the wind direction would cause counter-rotation of turbine blades.

A still further objective is to provide such an invention capable of acting to rotate the turbine so as to face for preferred blade rotation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
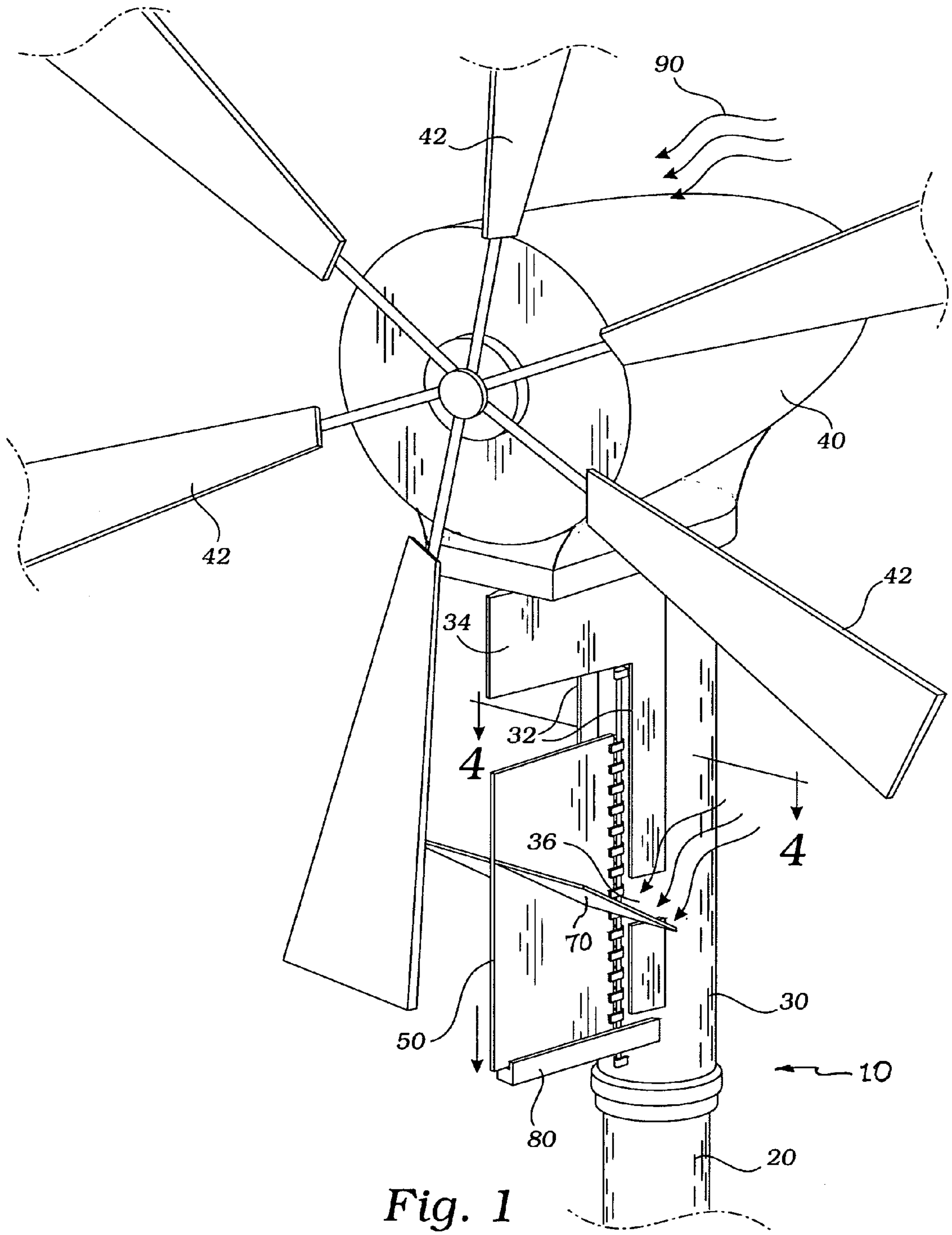
FIG. 1 is a perspective view of the preferred embodiment of the invention, showing a wind turbine under normal wind conditions.
Figure 2:
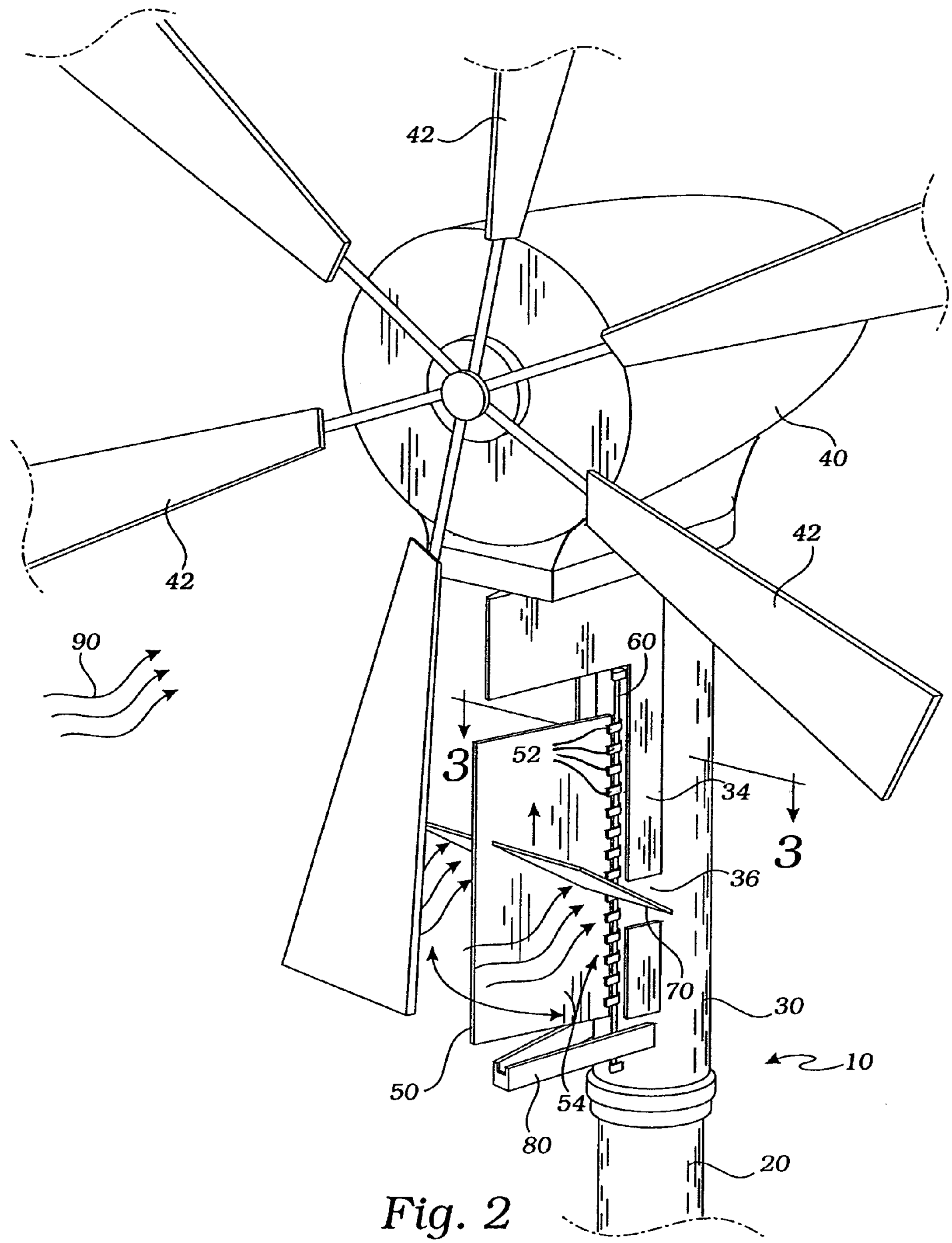
FIG. 2 is a perspective view thereof, showing the wind turbine under reverse wind conditions wherein a control vane is lifted and moved laterally to cause rotation of the turbine to the normal position for driving the wind turbine's blades in a correct rotational sense.
Figure 3:
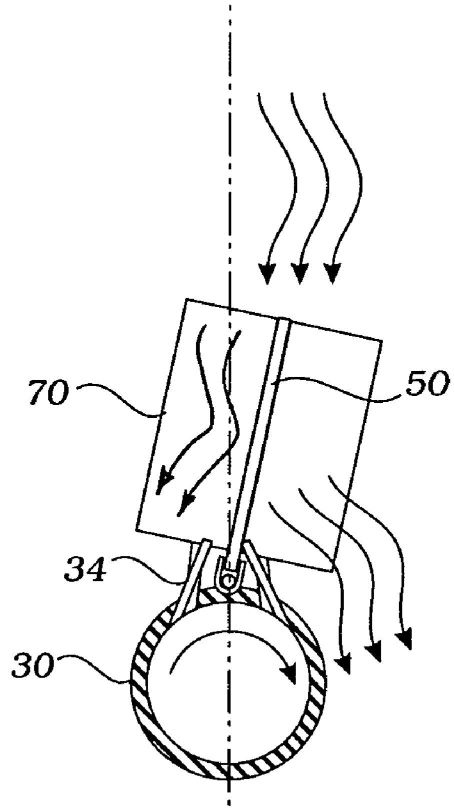
FIG. 3 is a section view taken along line 3—3 in FIG. 2.
Figure 4:
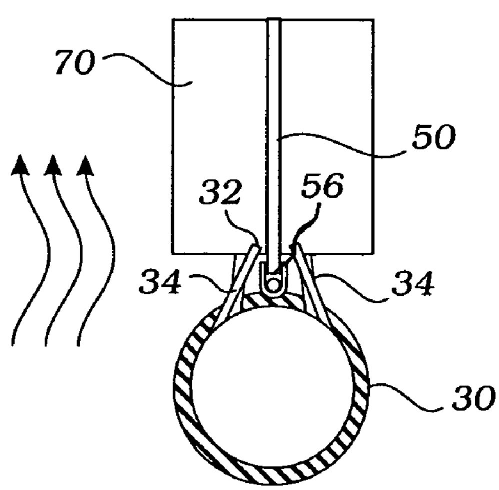
FIG. 4 is a section view taken along line 4—4 in FIG. 1.

The present invention is a wind turbine apparatus which comprises a support tower 10 having a fixed lower tower portion 20 engaged axially with a rotatable upper tower portion 30 which supports an electric generating turbine 40. The mechanics of the latter are well known in the art. The turbine 40 provides plural, radially oriented, turbine blades 42 engaged rotationally with the turbine 40 and rotate in a generally vertical plane. The upper tower portion 30 further provides a vertically oriented control vane 50 mounted on a hinge bar 60 of the upper tower portion 30. The control vane 50 is movable vertically along the hinge bar 60 and, further, is movable bilaterally in rotation about the hinge bar 60, i.e., the control vane 50 is able to rotate to the left or right of its nominal position, shown in FIG. 1. The control vane 50 engages a control surface 70 positioned crosswise to the control vane 50 and tilted for lifting the control vane 50 out of a restraint well 80 under the force of a reversed wind vector 90, as shown in FIG. 2. This would be the case when the turbine 40 is facing backward to the wind as might happen if the wind vector 90 reverses itself suddenly. FIG. 1 shows the condition when the wind vector 90 is as required for driving the turbine in a preferred rotational sense. In this case the wind vector 90, enables pressing of the control vane 50 into the restraint well 80 as shown in FIG. 1. This occurs when the control vane 50 is aligned with the restraint well 80 and the wind vector 90 is aligned with the rotational axis of the turbine 40. The control vane 50 is urged, by the wind vector 90, to rotate laterally when it is lifted out of the restraint well 80, thereby causing, by wind pressure on the control vane 50, the upper tower portion 30 to rotate with respect to the lower tower portion 20 until the control vane 50 is pressed, once more, into the restraint well 80, so as to align the turbine blades 42 for preferred blade and turbine 40 rotational motion (FIG. 1).

Preferably, the restraint well 80 is an upwardly facing channel fixed to the upper tower portion 30 and extending outwardly therefrom, as best seen in FIG. 2.

Preferably, the control vane 50 provides a plurality of hinge ribs 52 aligned along one edge 54 thereof, the hinge ribs 52 providing rotational and translational clearance 56 for moving the hinge ribs 52, and the control vane 50 relative to the hinge bar 60.

Preferably, spaced apart lateral stop surfaces 32 of a cowling 34, which convergently extends downwind outwardly from the upper tower portion 30 when the apparatus is receiving the wind vector 90 for normal rotation of the turbine blades 42, are positioned for limiting lateral motion of the control vane 50 as shown in FIG. 2. The lateral stop surfaces 32 each provide a clearance space 36 for receiving the control surface 70 so that interference is avoided between the control surface 70 and the cowling 34.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A wind turbine apparatus comprising: a support tower having a fixed lower tower portion engaged axially with a rotatable upper tower portion supporting an electric generating turbine, the turbine providing plural, radially oriented, blades engaged for rotating in a vertical plane; the upper tower portion further providing a vertically oriented control vane mounted on a hinge bar of the upper tower portion, the control vane movable vertically along the hinge bar and, further, movable bilaterally about the hinge bar; the control vane engaging a control surface positioned for lifting the control vane out of a restraint well under the force of a wind vector moving in a first horizontal direction, and for pressing the control vane into the restraint well under the force of a wind vector moving in a second direction, whereby, the control vane is urged to rotate laterally when lifted out of the restraint well, thereby rotating the upper tower portion about the lower tower portion until the control vane is pressed into the restraint well so as to align the blades for a preferred blade rotational direction.

2. The apparatus of claim 1 wherein the restraint well is a channel.

3. The apparatus of claim 1 wherein the control vane provides a plurality of hinge ribs aligned along one edge thereof, the hinge ribs providing rotational and translational clearance for moving relative to the hinge bar.

4. The apparatus of claim 1 further comprising spaced apart lateral stop surfaces positioned for limiting lateral motion of the control vane.

5. The apparatus of claim 4 wherein the lateral stop surfaces each provide a clearance space engaging the control surface.

* * * * *